May 12, 1959 — W. C. RUDD — 2,886,691
LAPPED WELDING OF METAL EDGE PORTIONS
Filed Aug. 11, 1958 — 2 Sheets-Sheet 2
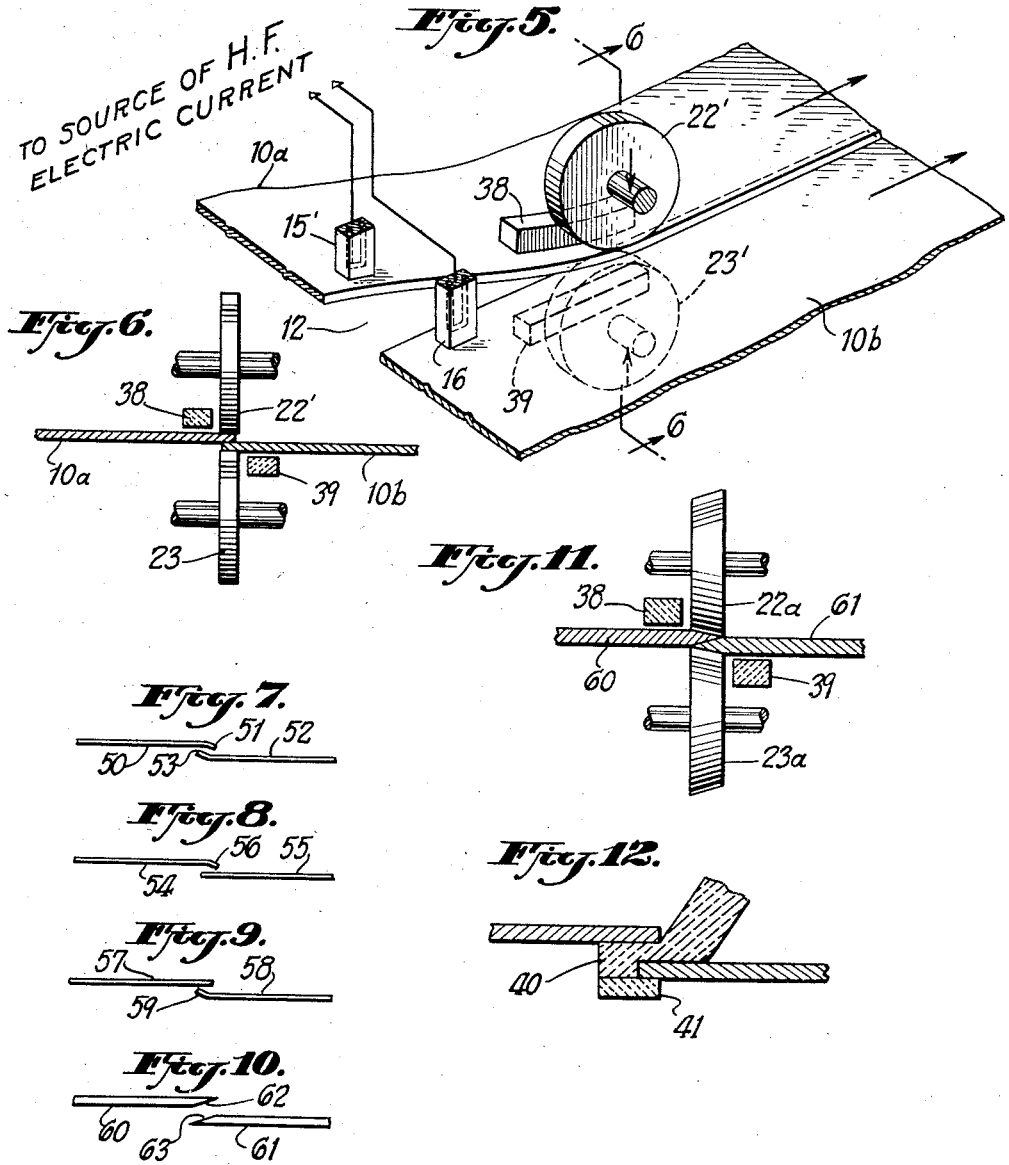
INVENTOR.
WALLACE C. RUDD.
BY
ATTORNEYS.

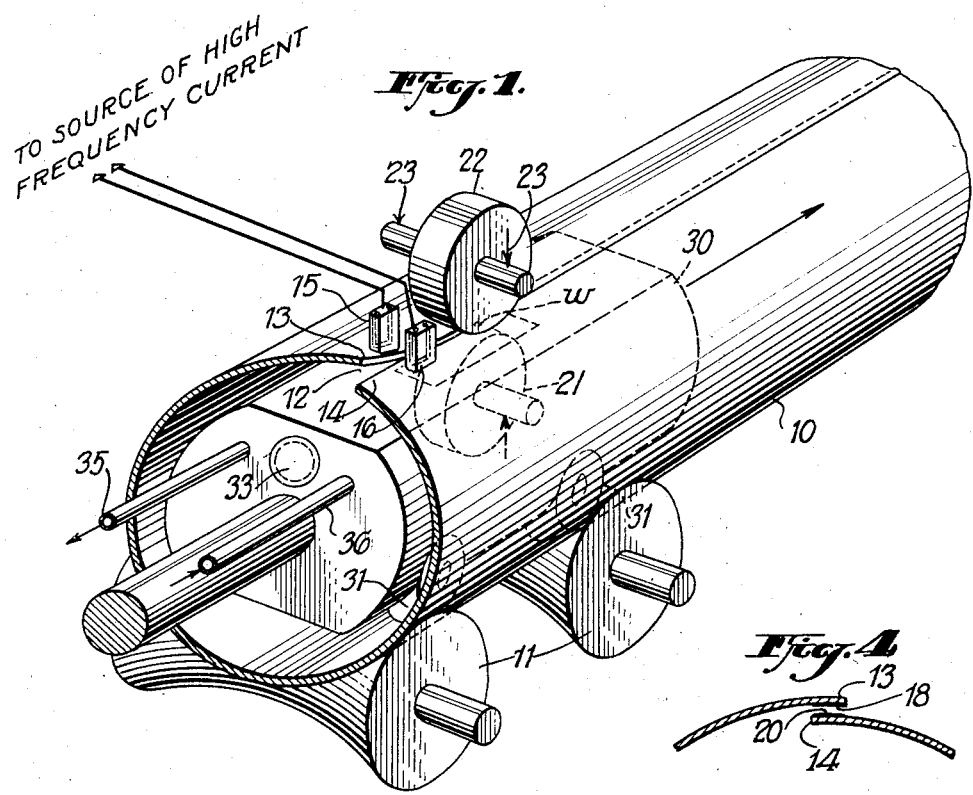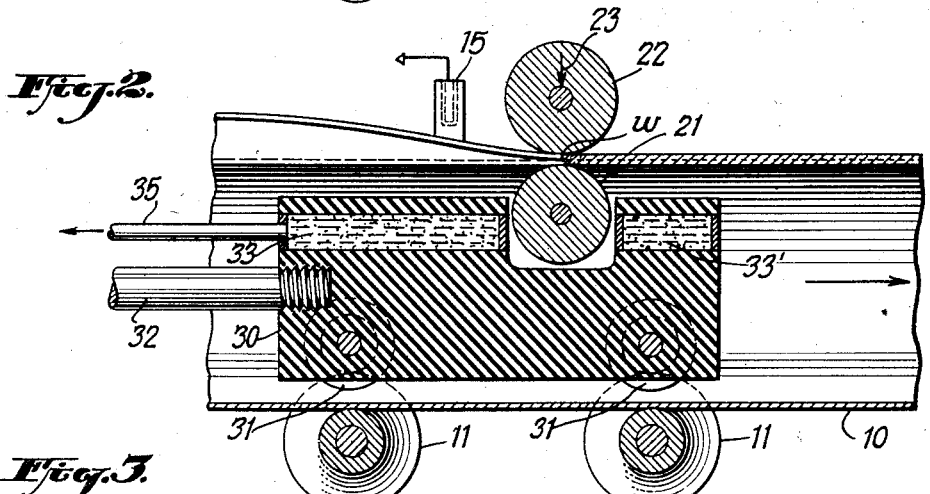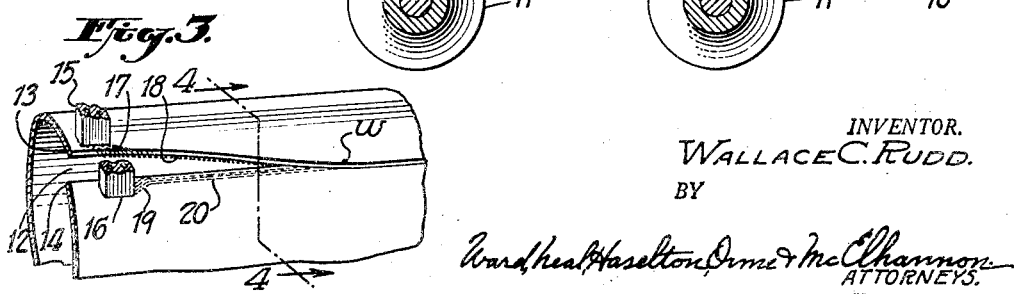

United States Patent Office 2,886,691
Patented May 12, 1959

2,886,691

LAPPED WELDING OF METAL EDGE PORTIONS

Wallace C. Rudd, Larchmont, N.Y., assignor to Magnetic Heating Corp., New Rochelle, N.Y., a corporation of New York Application August 11, 1958, Serial No. 754,240

9 Claims. (Cl. 219—67)

This invention relates to methods and apparatus for continuously welding together longitudinal opposed edges of metal portions such as portions along a desired line of welding of a continuing length of tubing or continuing lengths of strips. More particularly, the invention is directed to the use of high frequency electrical heating current conductively applied along the line of the desired welded seam in such manner and with the parts so arranged as to form lapped welded seams at very high speeds.

In the U.S. Patent to Rudd et al. No. 2,818,488, granted December 31, 1957, methods and apparatus are disclosed for using high frequency current to weld together opposed edges of a gap in metal tube stock where in the opposed edges are brought together in abutting relationship with a V-shaped gap therebetween as they approach the weld point, the weld point being at the apex of the gap and the high frequency heating current being applied by electrodes engaging respectively the opposite sides of the gap so that the current flows from such electrodes along the gap edges to and from the weld point where the abutting edges reach welding temperature and become welded.

While the method of said patent is highly successful for welding tubing for example with a butt welded seam and where the metal has substantial thickness, yet when it is attempted to use such a method for welding thin sheet metal portions, difficulties are encountered in controlling the position of the approaching abutting thin edges in such manner that they will be brought into proper uniform contact under the requisite pressure to cause a uniform weld. Any irregularities in the alignment of the thin abutting edges causes an imperfect weld in that only the portions of the abutting edges which are brought into actual abutting relation become welded together and in some cases one edge may become buckled slightly differently from the other so that the weld is uncertain, even if the difficulties of applying adequate edge-to-edge pressure are overcome with the thin and pliable sheet metal.

With the present invention, however, methods and apparatus are provided for welding such thin sheet metal portions with a lapped seam and at quite surprisingly high speeds, so high in fact as to amount to some one hundred percent or even several hundred percent greater than any speed which has been accomplished heretofore in the art of seam welding so far as is known. For example, tests of the present invention have shown that it is capable of very satisfactorily welding lapped seams at rates as high as 700 and doubtless from 1000 to 2000 feet per minute, the higher speeds being many times higher than heretofore attainable for example with the high frequency butt welding method of the above-mentioned patent.

The present invention is well adapted for example to the welding of continuing lengths of thin sheet metal tubing formed of sheet steel, aluminum or alloys thereof and such as used in the manufacture of cans for containing comestibles, liquids or other materials as sold at retail and in which the sheet metal may be of a thickness for example of about ten thousandths of an inch or less.

In accordance with the invention, the metal portions which are continuously longitudinally advanced and which are to be welded together, for example the opposed edges at a gap extending longitudinally of tube stock, are brought together in slightly overlapped relationship so as to meet at a weld point and these overlapping edges are heated by applying electrodes thereto respectively in a certain way shortly in advance of the weld point and connected to a source of high frequency current and whereby the current flows from such electrodes respectively along bands on the opposed overlapping surface areas as same approach the weld point. (For brevity, the location at which the welding occurs is herein referred to as the "weld point," but actually the welding occurs substantially along a short line running at right angles to the narrow overlapping bands which have been heated rather than at a "point.") The electrode which is applied to the underlying advancing lapped portion may be applied at an area spaced somewhat back away from the edge of the metal portion so as not to interfere with the edge of the overlying advancing metal portion. And the electrode for the overlying lapped portion may preferably be applied to the upper surface of such portion, but nevertheless the high frequency current will travel therefrom around over the edge to its underside and become concentrated along on the undersurface of the overlying edge to heat a band of such surface. The current from the electrode on the underlying metal portion will also travel along a band on the upper surface of the underlying portion to the weld point. The current will be caused to be closely concentrated along these bands on the opposed approaching surfaces and the bands which become heated to welding temperature will be substantially the same width as the width of the overlap by reason of the mutual inductance effects as between the currents on the upper and lower opposed surfaces which become more and more intensely concentrated on and confined to the very surfaces as the gap therebetween becomes narrower. The result is that with the high welding speeds above referred to, the undersurface of the underlying lapped metal portion to be welded and the upper surface of the overlying lapped metal portion will remain at a temperature below welding temperature and in firm unfused condition, even though the bands on the opposed surfaces which are heated to welding temperature and softened are only a few thousandths of an inch away from the surfaces which do remain firm. This makes it possible according to the invention, to apply a pressure roller directly above the weld point and another roller or other suitable firm pressure-receiving support directly in under the weld point, without marring, distorting or injuring the sheet metal surfaces engaged by the rollers, thereby permitting the forcing of the overlapping surfaces firmly together to form a good forged weld and without any danger of buckling of the metal along the welded seam or any such misalignment of the portions to be welded as would cause an irregular weld. These factors in combination appear to make possible the surprisingly high welding speeds above mentioned. In fact, for satisfactory results, the unprecedentedly high speeds appear to be essential to the practice of the invention. Otherwise heat from the hot surface bands which come into welded contact will, by reason of thermal conduction cause heating and troublesome softening of the metal surfaces to which the pressure rollers are applied.

Various further and more specific objects, features and advantages of the invention will appear from the description given below, taken in connection with the accompanying drawings, illustrating by way of example preferred forms of the invention.

In the drawings:

Fig. 1 is a somewhat schematic perspective view of apparatus for carrying out the invention for the welding of tubing, for example tubing for making cans, as above mentioned;

Fig. 2 is a vertical sectional view of the apparatus of Fig. 1;

Fig. 3 is a perspective view illustrating the paths or bands along which the heating current will flow in accordance with the invention;

Fig. 4 is a transverse sectional view partly broken away and taken substantially along the line 4—4 of Fig. 3;

Fig. 5 is a view similar to Fig. 1 but illustrating the invention as applied to the welding of metal portions which may be portions of stock other than tubular, this view illustrating certain additional features as well;

Fig. 6 is a vertical sectional view taken substantially along line 6—6 of Fig. 5;

Figs. 7 to 10 inclusive are sectional views showing various overlapped edge formations which may be welded with special advantages in accordance with the invention;

Fig. 11 is a vertical sectional view showing one possible arrangement of pressure rollers and other parts used in welding overlapped edge formations as of Fig. 10 for example; and Fig. 12 is a vertical sectional view showing the formation of certain spreader means which may be used to control the position of the overlapped edges at certain points in advance of the weld point, for example in the equipment of any of Figs. 1–6.

Referring now to Fig. 1 in further detail, a length of thin sheet metal tubing 10 is shown as being advanced in the direction of the arrow through the welding apparatus as by supporting rollers 11 as well as other rollers and equipment (not shown) of known types now available for advancing such tubular stock through tube mills and the like. That is, according to known methods, rollers may be provided at various points in advance of the equipment of Fig. 1 for shaping the stock into generally tubular form but with a gap as at 12, the opposed edges of such gap being indicated at 13 and 14. For best results the equipment should operate at a speed to advance the tubing at a rate of some 500–700 feet per minute or even up to 1000 to 2000 feet per minute. Usually the upper speed limit at which the welded product can be taken away and cut into lengths, will be the determining or limiting speed factor, rather than the speed at which the welding itself can be accomplished.

In accordance with the present invention, the advancing equipment is so shaped and arranged as to bring said edges into a predetermined spaced-apart overlapped relation as indicated by the sectional view of Fig. 4 and in such manner that the gap therebetween will rapidly diminish just in advance of a "weld point" as indicated at *w* in Fig. 3.

A pair of fluid-cooled contacts or electrodes as at 15, 16 respectively may be mounted on any suitable means (not shown) in position for slidably engaging the metal portions to be welded, shortly in advance of the weld point. These electrodes are respectively connected to the terminals of a source of high frequency current as indicated and they may be of a construction similar to those disclosed in the above-mentioned patent. As in the case of the method of said patent, the source of high frequency current may have a frequency of the order of about 100,000 cycles per second or preferably higher, such as from 300,000 to 500,000 cycles per second, and the currents of such frequencies will follow paths in the form of bands as shown in Fig. 3. That is, the electrode 15 as shown, is conveniently positioned to engage the upper surface of the overlying lapped portion and this contact may, if desired, be spaced back somewhat from the very edge 13 of such portion. Yet despite the fact that this contact engages the upper surface, the current flowing to and from same will follow a path on the surface of the metal in the form of a band extending to and over the edge 13 as indicated at 17 and thence down around and onto the underside to provide a heating band of current along on the undersurface of the overlying portion and as indicated at 18. The contact 16 may be placed to engage the upper surface of the underlying overlapped metal portion and at a position preferably spaced back away from the edge 14 thereof sufficiently so that the electrode will not interfere with the upper edge 13. And the current to and from electrode 16, however, will immediately be directed from such electrode along a heating band 19 to a band 20 on the upper surface of this underlying metal portion. Because of the highly effective mutual inductance between the bands of heating current 18 and 20, and because of the aforementioned high speeds of movement and the consequent mere momentary application of the heating current, the heating will be so confined to and concentrated upon the approaching band surfaces that same will be heated to actual welding temperature only to a depth of about 0.001" or probably less, thus leaving the opposite surfaces of the metal portions (viz. the undersurface of the underlying metal portion and the upper surface of the overlying metal portion) safely free of any danger of fusion or softening. Accordingly it is possible without distortion or injury to the metal surface as above stated, to provide inside the tubing directly under the "weld point" supporting means as for example a rigid metal roller as at 21 against which the overlapping portions may be firmly pressed together as by an upper roller or pressure-applying means 22 which is applied directly over the "weld point." The roller 22 or equivalent pressure-applying means may be pressed down as by any suitable spring or weighted means acting in the direction of the arrows indicated at 23. Thus the pressure-applying means 21 and 22 react against each other directly above and below the weld point so that there is no possibility that the overlapped metal portions to be welded can escape such pressure or vibrate, buckle or shift position in any such manner at the weld point as might cause an irregular weld and this is true despite the thinness of the metal being welded. Thus even though the surfaces which are actually fused for welding together are located between the pressure rollers, they do not come in contact at any time with the pressure rollers since the latter engage only the surfaces which remain solid and unfused. Thus the conditions make possible such firm uniform pressure as to make a high quality forged-type weld.

It may be noted at this point that it is desirable to bring the heated band 18 up to the same welding temperature as the heated band 20 by the time same reach the weld point, but the path of the current for heating the band 18 is such that the total amount of metal heated thereby will be somewhat greater than the amount of metal heated by the current on band 20, due to the flow of current over the edge at 17 to the contact 15. Thus to insure heating of band 18 to the same temperature as band 20, the electrode 16 is preferably placed somewhat closer to the weld point than the electrode 15.

The heated surface bands 18 and 20 are indicated in cross-section in Fig. 4 by the use of somewhat heavier lines. An electromagnetic field, will, of course, be established between said bands. Because of the powerful mutual inductance effect between said bands, and due to the fact that such field will be concentrated and largely confined to the space between said bands, it will be apparent that the surface portions which are heated to welding temperature can be substantially confined to just the surface portions which overlap. Thus, despite adjustments which may be made in the overlap, the overlapped portions may be fully welded together, leaving no unwelded edge or crevice either internally or externally of the tubing. On the other hand, if according to practices long followed in previous years, attempts were made to heat the metal for welding by the use of low frequency or direct current or ordinary commercial alternating currents, such currents would be distributed throughout the overlapping metal portions, and cause heating of all thereof to fusion, making possible only a slow, insecure or irregular weld and not one confined to the overlapped surfaces as is possible by the use of current of the high frequencies and applied as above described.

In order to support the inner pressure-applying means at the weld point, viz. the roller 21, suitable insulation carriage means as at 30 may be mounted in fixed position within the tubing and supported as by rollers 31 engaging the inside lower surface of the tubing. This carriage means may be retained in position as by a mandrel 32 attached thereto and extending back to any suitable supporting means located at a position prior to the point where the tube gap edges are brought close together. While the supporting roller 21 may preferably be located directly beneath the weld point as shown, yet in some cases, if desired, it may be located in advance of such point so long as it is positioned to maintain the undersurface of the underlying metal portion at a substantially predetermined elevation with respect to the upper pressure roller 22.

As in the case of the method of the above-mentioned patent, in order to minimize the loss of such heating current as may tend to flow from the electrodes in directions circumferentially around the tubing, core elements as at 33, 33' may be mounted in the carriage 30 and these act effectively to increase the inductance of current paths on the tube metal circumferentially of the tubing. A number of such core means may be provided as disclosed in said patent, and same may be formed of sintered magnetic oxide, an insulation material, preferably of types now well known, which have a low loss factor and high volume resistivity, for example such as the material marketed under the name "Ferramic" by General Ceramic and Steatite Corp. In view of the heavy losses which would otherwise occur in the presence of fields of high frequencies above mentioned, the core material should be such that eddy current losses therein will be minimized while the permeability thereof is substantially greater than unity. And to prevent overheating of such core means, cooling liquid such as water may be circulated in the carriage 30 along paths adjacent thereto as by introducing inlet and outlet conduits as at 35 and 36 into the carriage means.

While the advantages of the invention are, generally speaking, most important in the lap welding of material of only several thousandths of an inch thick, or say of a thickness of the order of ten-thousandths of an inch, yet the invention in various of its aspects may also be used for welding thicker metals.

For welding for example thin sheet steel tubular stock such as for forming cans of sheet metal of a thickness for example of from about 0.004" to about 0.015", the metal as shaped into tubular form may be so advanced that at the weld point the edges will overlap by 0.015" more or less. The contact as at 16 for engaging the underlying portion, may be positioned so that its portion nearest to the weld point will be spaced from the weld point by a distance of one inch. This contact may, for example, be placed one-eighth inch away from the underlying edge 14. The other contact 15 may be placed at or close to the overlying dege 13 and at a distance slightly further from the weld point than the contact 16, for example 1 1/16". The overlapped portions may be brought together at an angle such that, at a distance 2" in advance of the weld point, the overlapped opposed surface areas will be spaced apart by a distance of one-quarter inch. High frequency current of for example 400,000 cycles per second may under these conditions be applied to the contacts using a 50 kilowatt high frequency generator delivering such current at a voltage of 200 volts through a high frequency transformer having a step-down ratio of eight to one. And under these conditions, the tubular stock may preferably be advanced at a speed of from 400 to 500, up to about 2000 feet per minute. If the tubular stock is of aluminum rather than steel, then certain of the above factors may be altered as follows: The distance from the contacts to the weld point may be shortened. The speed may be increased and pressure on the squeeze rolls reduced.

With the variation of the invention shown in Fig. 5, the longitudinally advancing metal portions which are to be welded together with a lapped weld are indicated generally at 10a and 10b and the other parts corresponding to those of Fig. 1 are designated by the same reference characters accompanied by prime marks. Fig. 6 is a vertical sectional view showing the manner in which the pressure rollers engage the overlapped metal portions at the "weld point." In case the metal portions to be welded are of the same metal and if their edge portions are of the same thickness, then it will be understood that the electrodes 15' and 16' may be placed at nearly equal distances from the "weld point." However, if one or the other of the metal portions has greater heat dissipating or absorbing qualities than the other, so that it would require a slightly longer time to heat the heated band thereon up to proper welding temperature, then the electrode applied to such portion should be positioned at a somewhat greater distance from the weld point than the other electrode. This would be true also if one of the metal portions were of a metal such that it had be heated to a higher temperature than the other for effective welding.

In some cases it may be desirable to provide means for further concentrating the current along the surface bands desired to be heated and to achieve to the highest possible degree the conditions illustrated and described with reference to Fig. 4. If difficulties are encountered in confining the surface bands of heating in this manner, then blocks or elements 38 and 39 of magnetic material such as above described may be suitably mounted as shown in Fig. 5 to extend along in positions spaced back from the overlapped portions and spaced respectively slightly above and below the surfaces of the portions at 10a and 10b. These will have the effect of increasing impedance of current paths spaced back from the overlapped portions. If desired, these magnetic elements may be positioned instead in the manner indicated in Fig. 11.

In order accurately to control the degree of overlap of the metal portions to be welded as they approach the welding apparatus, insulation spacer elements as at 40, 41 may be mounted on any suitable supporting means (not shown) in positions as per Fig. 12, these elements being formed for example of a suitable high temperature and abrasion-resistant synthetic resinous material or of ceramic material. These elements may be mounted shortly in advance of the positions of the electrodes as shown in Figs. 1 and 5.

In some cases, in order to achieve exceedingly rapid welding speeds, while still insuring that there will be no exposed crevice at the lapped welded seam or any unwelded gaps, it may be desirable to bend or form the overlapped edges to be welded in various ways as shown in Figs. 7–10 inclusive. For example, in Fig. 7, the overlying metal portion 50 has the lower corner of its free edge 51 bent down slightly more closely to approach the other metal portion 52, whereas the innermost upper edge corner 53 of member 52 is bent slightly upwardly more closely to approach the surface of member 50. In this way, the heating current may be made most concentrated along two parallel lines, viz. one just at the outer portion of the overlap and the other just at the inner portion, such concentration arising from the greater mutual inductance effect occurring at the most closely adjacent edge portions. Thus in this way, one may be assured that neither on the upper nor lower surfaces of the welt will there be any overhanging edge portion, such as might provide any slight crevice. As shown in Fig. 8, portions 54 and 55 are to be welded together, and here the lower and very outer edge corner 56 of the overlying portion 54 is bent down slightly merely closely to approach the member 55. This will insure the greater concentration of heating at the very outermost portion of the overlap, while the underlying overlap portion may be left straight. Fig. 9 shows a similar condition for the welding of parts 57 and 58, except that here the underlying edge corner 59 is bent up slightly closer to the portion 57 to insure that there will be no gaps at the welded seam at this point. Effective results such as here explained in connection with Figs. 7, 8 and 9, may be obtained by simply shearing the edges which are to be deflected in such manner that they will be deflected slightly more than the other parts in the direction desired. For welding these shapes, the electrodes and other parts may be positioned the same as in Figs. 1 and 5.

In case the overlapped edges which are to be welded are of somewhat thicker metal and if it is desired that the welded zone nevertheless be about the same thickness as other parts, then portions 60, 61 to be welded as shown in Fig. 10, may have their edges respectively oppositely beveled as at 62, 63. In welding, such edges may be brought together as by the use of pressure rollers as shown in Fig. 6, or if preferred, the pressure rollers may be slightly oppositely beveled as are the rollers 22a and 23a, as shown in Fig. 11.

In addition to the advantages as above explained, the invention has the further possibility of being used for forming a longitudinal welded seam on tubular stock such as used for the manufacture of cams and which, prior to the welding, bears lithography on its external surfaces. For example, the lithography may extend to the very edge of the overlying portion of the seam and on the underlying portion the lithography may extend up as far as the portion which is to be overlapped by the overlying portion and still the electrodes or contacts as at 15, 16 may be located in the positions shown and above described in connection with Figs. 1 and 3. With the use of the above-mentioned high frequency currents with such contacts and even though the contacts bear against the lithographic work instead of against the bare metal, still such current may be conducted onto the metal since if the lithography is of a conductive character, the current will be readily conducted from the contacts to the metal without arcing troubles at the frequencies mentioned, or if the lithography is more or less of an insulated nature, an adequate amount of current will be applied from the contacts to the metal by a combination of various effects such as a fine puncturing effect, resistance breakdown, capacitatively or by other phenomena.

While in the above descriptions and in the drawings, the lapped weld is shown and described as being formed along the upper or top surface of the tubular stock as it advances, it will be understood that, if desired, the apparatus could be so positioned that the welded seam would be formed along one or another of the sides of the tubular stock or along the bottom thereof. Accordingly, where references are made herein such as to "underlying" or "overlying" advancing lapped portions, it will be understood that these and similar terms are intended to apply in an equivalent way, even though the apparatus may be turned to other positions than shown about the longitudinal axis of the advancing tube.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Method for welding together with a lapped seam, the portions adjacent a longitudinal gap in thin sheet metal tubing having a wall thickness of the order of about ten-thousandths of an inch, which method comprises: longitudinally advancing the tubing while bringing one of said portions into overlying lapped relation to and with a diminishing spaced relation to the other, and whereby a narrow band on the undersurface of the overlying portion comes into contact with a narrow band on the upper surface of the underlying portion at a desired weld point; heating said bands in advance of the weld point by maintaining on same flows of electrical current of a frequency of the order of 100,000 cycles per second or higher by applying to said portions respectively current from the two terminals of a source of such current at points substantially in advance of the weld point, the current to the overlying portion being applied to the upper surface thereof and the current being applied to the underlying portion also on the upper surface thereof, whereby the current flows from the points of application, to the bands and to and from the weld point along on said bands, the current becoming more and more concentrated on the surfaces of said bands as they approach contact with each other due to the mutual inductance of the current, flowing thereon at said high frequency; maintaining supporting means within the tubing and engaging the undersurface of the underlying portion to retain same at a predetermined elevation while passing beneath the weld point; applying pressure to the upper surface of the overlying portion substantially directly over the weld point to press said portion firmly against and into welded relation to the underlying portion, the current as applied being sufficient to heat the surface of the metal along on said bands to welding temperature as same reach the weld point, and the tubing being advanced at a speed of about 400 feet per minute or higher and so rapdily that thermal conduction of heat from the heated surfaces of the bands is insufficient substantially to soften the upper surface of the overlying portion and the undersurface of the underlying portion.

2. Method for welding together with a lapped seam, the portions adjacent a longitudinal gap in tubing formed of thin and flexible sheet metal, which method comprises: longitudinally advancing the tubing while bringing one of said portions into overlying lapped relation to, and with a diminishing spaced relation to the other, and whereby a narrow band on the undersurface of the overlying portion comes into contact with a narrow band on the upper surface of the underlying portion at a desired weld point; heating said bands in advance of the weld point by maintaining on same flows of electrical current of a frequency of the order of 100,000 cycles per second or higher by applying to said portions respectively current from the two terminals of a source of such current at points substantially in advance of the weld point, whereby the current flows from the points of application to and from the weld point along on said bands, the current becoming more and more concentrated on the surfaces of said bands as they approach contact with each other due to the mutual inductance of the current flowing thereon at said high frequency; maintaining supporting means within the tubing and engaging the undersurface of the underlying portion to retain same at a predetermined elevation while passing beneath the weld point; applying pressure to the upper surface of the overlying portion over the weld point to press said portion firmly against and into welded relation to the underlying portion, the current as applied being sufficient to heat the surface of the metal along said bands to welding temperature as same reach the weld point, and the tubing being advanced at a speed of about 400 feet per minute or higher and so rapidly that thermal conduction of heat from the heated bands is insufficient to heat to welding temperature the upper surface of the overlying portion and the undersurface of the underlying portion.

3. Method for welding together with a lapped seam, the portions adjacent a longitudinal gap in tubing formed of thin and flexible sheet metal, which method comprises: longitudinally advancing the tubing while bringing one of said portions into overlying lapped relation to, and with a diminishing spaced relation to the other, and whereby a narrow band on the undersurface of the overlying portion comes into contact with a narrow band on the upper surface of the underlying portion at a desired weld point; heating said bands in advance of the weld point by maintaining on same flows of electrical current of a frequency of the order of 100,000 cycles per second or higher by applying to said portions respectively current from the two terminals of a source of such current at points substantially in advance of the weld point, whereby the current flows from the points of application to and from the weld point along on said bands, the current becoming more and more concentrated on the surfaces of said bands as they approach contact with each other due to the mutual inductance of the current flowing thereon at said high frequency; maintaining supporting means within the tubing and engaging the undersurface of the underlying portion at a region beneath the weld point; applying pressure to the upper surface of the overlying portion over the weld point to press said portion firmly against and into welded relation to the underlying portion, the speed of such longitudinal advancing and the current as applied being such as to cause heating of substantially only the contacting surfaces of the metal along said bands to welding temperature substantially as same reach the weld point.

4. Method for welding together two elongated sheet metal portions with a lapped seam, comprising: longitudinally advancing the portions while bringing one of same into partially overlying lapped relation to, and with a diminishing spaced relation to the other, and whereby a narrow band on the undersurface of the overlying portion comes into contact with a narrow band on the upper surface of the underlying portion at a desired weld point; heating said bands in advance of the weld point by maintaining on same flows of electrical current of a frequency of the order of 100,000 cycles per second or higher by applying to said portions respectively current from the two terminals of a source of such current at points substantially in advance of the weld point, whereby the current flows from the points of application to and from the weld point along on said bands, the current becoming more and more concentrated on the surfaces of said bands as they approach contact with each other due to the mutual inductance of the current on said bands at said high frequency; maintaining supporting means engaging the undersurface of the underlying portion at a region substantially directly beneath the weld point; applying pressure to the upper surface of the overlying portion substantially directly over the weld point to press said portion firmly against and into welded relation to the underlying portion, the current as applied being sufficient to heat the surface of the metal along on said bands to welding temperature as same reach the weld point, and the portions being advanced at a speed of about 400 feet per minute or higher and so rapidly that thermal conduction of heat from the heated bands is insufficient to heat to welding temperature the upper surface of the overlying portion and the undersurface of the underlying portion.

5. Method in accordance with the foregoing claim 4 and in which the current to the overlying portion is applied to the upper surface thereof, but is caused by the mutual inductance to flow over the edge of such overlying portion and onto the said band along on the undersurface of the overlying portion, such current being thus applied to the overlying portion at a location spaced sufficiently further from the weld point than the location of application of the current to the underlying portion, whereby said bands on both portions become heated to substantially the same welding temperature at the weld point.

6. Method in accordance with the foregoing claim 4 and in which the edge of at least one of said portions, prior to its being brought into lapped relation to the other, is deflected in a direction toward the other portion, thereby, due to the effect of mutual induction, increasing the degree of concentration of the heating current on said deflected edge and on the part of the other portion which extends along nearest such deflected edge in advance of the weld point.

7. Apparatus for welding together with a lapped seam the portions adjacent a longitudinal gap in tubing formed of thin flexible sheet metal, such apparatus comprising in combination: means for rapidly advancing the tubing at a speed of at least several hundred feet per minute, while bringing one of said portions in overlying lapped relation to, and with a diminishing spaced relation to the other, whereby a narrow band on the undersurface of the overlying portion will come into contact with a narrow band on the upper surface on the underlying portion at a desired weld point; means for heating said bands in advance of the weld point comprising a source of electrical current of a frequency of the order of 100,000 cycles per second or higher and a pair of contacts connected to the terminals of said source respectively and respectively positioned to apply such current to said portions substantially in advance of the weld point, whereby the current will flow from said contacts respectively to and from the weld point and along on said bands; a roller positioned in the tubing to engage the zone of the lapped seam therein to support same at a predetermined elevation while passing beneath the weld point; supporting means extending into the tubing for supporting said roller on substantially a fixed axis; and a pressure-applying roller and means for supporting same in a position to apply pressure to the overlying portion at a zone substantially directly over the weld point to press said portion firmly against and into welded relation to the underlying portion.

8. Apparatus in accordance with the foregoing claim 7 and in which insulation means is provided at a location substantially in advance of the weld point, shaped to embrace the edge of the underlying portion and to be engaged by the overlapping part of the overlying portion and to be slidably engaged by both to retain same at a predetermined spaced-apart position and with a predetermined overlap of the portions as they pass said location.

9. Method in accordance with the foregoing claim 4 and in which said narrow bands as pressed into engagement substantially at the weld point, engage, when viewed in transverse cross-section, along a line extending diagonally with respect to the upper and under surfaces of the metal portions.

References Cited in the file of this patent

UNITED STATES PATENTS

| | | |
|---|---|---|
| 1,854,957 | Richard | Apr. 19, 1932 |
| 1,865,845 | Dyer | July 5, 1932 |
| 2,376,762 | Ferguson | May 22, 1945 |
| 2,794,108 | Park | May 28, 1957 |